Patented Oct. 29, 1946

2,410,073

UNITED STATES PATENT OFFICE 2,410,073

MANUFACTURE OF POLYESTERS

John B. Howard, Summit, N. J., assignor to Bell Telephone Laboratories, Incorporated, New York, N. Y., a corporation of New York No Drawing. Application June 24, 1943, Serial No. 492,155

7 Claims. (Cl. 260—75)

This invention relates to methods of producing polyesters of high molecular weight from glycols and dicarboxylic acids.

Linear polyesters of high molecular weight, both crystalline and non-crystalline, have been found to have properties rendering them valuable for many purposes. High molecular weight polyesters have in the past been produced from glycols and dicarboxylic acids by heating them together under conditions permitting the effective elimination of the water which is a by-product of the esterification, as described, for instance, in United States Patent 2,071,250.

In the early stages of this reaction, the reaction mixture contains free glycol, free dicarboxylic acid and esters of varying low molecular weights produced by the esterification of varying numbers of glycol and acid molecules. Of these constituents both the dicarboxylic acid and the esters have low vapor pressures at the reaction temperatures and, therefore, have little tendency to vaporize. The glycols, on the other hand, have relatively higher vapor pressures and tend to be volatilized. Therefore, inevitably as the reaction progresses during its early stages, the glycol to acid ratio in the mixture will decrease.

As the reaction progresses, however, all the reactable free glycol and acid are used up in the formation of low molecular weight esters. Thenceforth as the reaction proceeds, with the formation of higher molecular weight esters, there is less tendency toward loss of glycol beyond that in excess of an amount equivalent to the dicarboxylic acid present.

It can be argued on a theoretical basis that almost exactly equimolar quantities of glycol and dicarboxylic acid must be esterified to produce a polyester of very high molecular weight. If either constituent predominates, the esterification reaction will eventually reach a point at which all the polyester molecules have hydroxyl endings or all of the polyester molecules have carboxyl endings. At this point further esterification can proceed only by elimination of the constituent which predominates.

Therefore, in the past, the ideal conditions have been considered to be attained when exactly enough excess glycol was added to the initial reaction mixture so that the entire excess, and no more, would be lost by volatilization at the time when all the original free dicarboxylic acid had been esterified with an equimolar quantity of glycol. If the conditions of reaction were such that a large amount of glycol was lost in the early stages of the reaction, a correspondingly large excess of glycol would be used to achieve this ideal condition. If precautions were taken to avoid loss of glycol, a correspondingly smaller excess would be used.

Preparation of high molecular weight linear polyesters containing no non-benzenoid unsaturation by these procedures was suitable for ordinary purposes in spite of the inconvenience and added expense caused by the fact that often very prolonged periods of reaction were required to bring the molecular weight to the desired value. However, when it has been desired to prepare polyesters of correspondingly high degrees of esterification from glycols and dicarboxylic acids at least one of which contains non-benzenoid unsaturation, it has been found not always possible to achieve the degree of esterification desired by this procedure. When such unsaturation is present, particularly if it consists of olefinic double bonds conjugated either with other carbon-to-carbon double bonds, as in muconic acid, or with the carbon-to-oxygen double bonds of a carboxyl or ester group, as in fumaric, itaconic or mesaconic acids, a cross-linking reaction involving the double bonds occurs between adjacent ester molecules simultaneously with the esterification reaction.

If too prolonged a heating period is required before the desired degree of esterification is achieved, the cross-linking may lead to undesirably high viscosity in the reaction product and may even cause gelation before the esterification has been carried to the desired point, thus making it impossible to secure a fluid or fusible end-product of the required degree of linear growth. It is therefore desirable, when using unsaturated reactants, to carry the esterification reaction to the required point in as short a time as possible.

The present invention provides a process of producing high molecular weight polyesters from glycols and dicarboxylic acids, wherein the reaction time during which the reaction mixture is exposed to elevated temperatures is consistently maintained at a minimum. This novel process permits the consistent production of unsaturated polyesters of a molecular weight and of a degree of unsaturation not always achievable by the older processes. Although of particular importance for the preparation of partially unsaturated polyesters, the present invention is also of advantage when used for the manufacture of fully saturated polyesters.

In the process of the present invention, a substantial excess of glycol is purposely maintained in the reaction mixture up to the point where substantially complete esterification of all carboxyl groups in the reaction mixture is obtained and no further water vapor is evolved by esterification. This is accomplished by adding initially to the reaction mixture a considerable excess of glycol and by retaining the major portion of this excess glycol in the sphere of reaction by heating the reaction mixture in a closed reaction vessel equipped with a packed reflux condenser heated to a temperature sufficient to allow escape of water vapor while returning the major portion of the vaporized and recondensed glycol. The amount of excess glycol used initially will depend upon the size and type of the apparatus used and upon the efficiency of the fractionating column. In every case, a sufficient amount of glycol should be used so that a definite excess, at least 1 or 2 mol per cent but preferably about 5 mol per cent or 10 mol per cent, remains at the end of the esterification reaction.

In the preparation of small batches of polyester, of the order of a pound or less where the size of the fractionating column is large compared to the reaction vessel and a considerable proportion of the initial excess of glycol is necessarily lost in wetting the packing of the column, it is preferable to use initially at least a 20 mol per cent excess of glycol. Theoretically there is no upper limit to the amount of excess glycol which can be used, but ordinarily no practical advantage will be gained by using an excess greater than about 200 mol per cent. In most cases not more than 50 mol per cent will be used.

When large batches, of the order of a hundred pounds or more, are prepared, the fractionating column is relatively small compared to the reaction vessel and, with efficient fractionation, only a correspondingly small proportion of glycol will be retained in the packing. Under these conditions, much of the advantage of the present invention will be obtained with initial excesses of glycol of 5 mol per cent or approaching the lower limits given above.

The reaction is carried out at a temperature between about 180° C. and about 250° C., but preferably in the vicinity of about 200° C., particularly when unsaturated reactants are used. The time required for esterification is shortened by the use of small amounts of esterification catalysts, such as the heavy metal halides, particularly zinc chloride, and by continuously agitating the reaction mixture by bubbling an inert gas, such as dry, oxygen-free hydrogen through the reaction mixture. In addition, a mechanical stirrer may be used. The reflux condenser is maintained at a temperature of about 110° C. to insure the escape of water vapor while condensing the vaporized glycol.

The large excess of glycol present in the reaction mixture pushes the esterification rapidly to substantial completion and is of particular value in the later stages of the esterification, when the rate would ordinarily be slowed considerably in the absence of such excess. Ordinarily with small batches and good reaction conditions, the evolution of water vapor will cease in from 3 to 5 hours. With larger batches, the time required will depend upon the efficiency with which the water of esterification is removed from the reaction mixture.

At this point, the reaction mixture is made up substantially entirely of relatively low molecular weight polyester molecules, the average molecular weight of which is dependent upon the amount of excess glycol remaining. If more than 100 per cent excess glycol remains in the reaction mixture, the mixture will consist essentially of free glycol and diglycol monoacid ester. When ethylene glycol is reacted, for instance, with succinic acid, or a mixture of succinic and maleic acids, and a 20 per cent excess of glycol remains at the completion of the initial esterification, the polyester present will have an average molecular weight in the vicinity of 600. If a greater excess of glycol remains, the molecular weight will necessarily be less, being in the vicinity of 300 for an excess of about 50 per cent.

From this point in the reaction, further increase in the molecular weight of the polyester by condensation can proceed only by ester interchange and by the elimination from the reaction mixture of the free glycol produced. To accomplish this, the mixture resulting from the first stage of the reaction is heated at substantially the same temperature in a closed vessel not equipped with a reflux condenser, under reduced pressure, while continuing the agitation with bubbling gas. After a relatively short time, a substantial increase in viscosity can be observed indicating a relatively rapid increase in molecular weight. The reaction is allowed to proceed until the desired degree of condensation is achieved.

With small batches of the order of a quarter of a pound or less at temperatures in the vicinity of 250° C., it is possible with about 3 to 5 hours of this vacuum treatment to achieve a degree of condensation corresponding to molecular weights considerably in excess of 10,000 (as estimated by the Staudinger viscosity method) for the strictly linear saturated polyesters, corresponding to intrinsic viscosities considerably in excess of .4 for these polymers. Crystalline polyesters of this degree of condensation possess the property of cold drawing. Polyesters containing unsaturated carbon-to-carbon bonds and possessing a similar degree of condensation (corresponding to at least 98 ester groups per 100 total ester, hydroxyl and carboxyl groups in the polyester) can be produced in similarly short times in small batches. With larger batches and lower temperatures, somewhat longer periods of vacuum treatment are necessary.

This relatively simple process of the present invention consistently produces polyesters of the desired high molecular weight in a period of time obtainable only erratically and under the most favorable conditions with the processes previously employed. When a substantial proportion of unsaturated carbon-to-carbon bonds is present in the ingredients of the initial reaction mixture, this consistently rapid preparation is of particular importance. In many cases, the method of the present invention provides the only reliable means for preparing polyesters having very high molecular weights and containing substantial amounts of unsaturation, but not possessing excessively high melt viscosities.

The process of the present invention is applicable to the preparation of polyesters from any glycols and dicarboxylic acids which are capable of esterifying to form linear ester chains having lengths of the order desired. Typical saturated glycols and dicarboxylic acids are described in United States Patent 2,071,250. Unsaturation may be introduced by substituting a conjugated unsaturated dicarboxylic acid, such as muconic, maleic, fumaric, itaconic or mesaconic acids, for a portion of the saturated acids or by substituting a non-conjugated unsaturated dicarboxylic acid, such as dihydromuconic acid, for all or a part of the saturated acid. Similarly, a glycol containing olefinic or non-benzenoid unsaturation may be substituted for a portion or all of the saturated glycol.

When it is desired to produce crystalline polyesters possessing the property of cold drawing or non-crystalline polyesters of a correspondingly high degree of condensation, particularly polyesters possessing a degree of esterification in excess of 98 per cent, it is necessary to limit the amount of conjugated unsaturation present in the reaction mixture so that the resulting theoretical polyester which would be produced if no cross-linking occurred would contain less than about 5 such olefinic bonds per 400 atoms in the linear chain and preferably less than about 2 such bonds per 400 atoms in the linear chain. The unsaturation will ordinarily be limited to this degree in a reaction mixture made up of a saturated glycol, a saturated dicarboxylic acid and a dicarboxyl acid containing olefinic unsaturation wherein the unsaturated acid constitutes less than 10 mol per cent, and preferably less than 5 mol per cent of the total dicarboxylic acid present.

Where it is not desired to produce polyesters of such a high degree of condensation, it is obviously possible to use larger amounts of unsaturation. The process of the present invention will in any case permit the achievement of a higher degree of condensation without gelation, for any particular amount of unsaturation than would be obtainable by previous methods. In certain cases where a combination of somewhat higher unsaturation with a high degree of condensation is desirable, some additional advantage can be gained through the addition of small amounts of an antioxidant, such as phenyl β-naphthylamine, to the initial reaction mixture to retard crosslinking.

The following specific examples will illustrate the manner in which the process of the present invention may be practiced:

*Example 1*

About one pound of a reaction mixture made up of a dicarboxylic acid mixture containing 96 mol per cent of sebacic acid and 4 mol per cent maleic acid together with about 25 mol per cent excess, over the equimolar amount, of a glycol mixture containing 80 mol per cent isopropylene glycol and 20 mol per cent ethylene glycol was heated in a closed glass reaction vessel maintained at about 200° C. while a slow stream of dry, oxygen-free hydrogen was bubbled through it. About 0.1 per cent by weight of zinc chloride was present as a catalyst. The reaction vessel was equipped with a reflux condenser maintained at a temperature of about 110° C. After about 5 hours no more water was being evolved from the reaction mixture. The reflux condenser was then removed and the pressure in the system was reduced to about 6 millimeters of mercury. The temperature was maintained at 200° C. and the bubbling of hydrogen was continued. Glycol distilled over rapidly and the viscosity of the mixture increased rapidly. After 6 hours of vacuum treatment, a polyester was obtained which was a viscous amorphous gum which crystallized slowly at room temperature to a flexible, somewhat rubbery, translucent, slightly crystalline solid. This gum, when milled with .75 per cent benzoyl peroxide and 150 per cent of the red oxide of iron sold commercially as Mapico 297 and cured in a mold at 125° C. for 10 minutes, was converted to a synthetic rubber having a tensile strength of about 2600 pounds per square inch.

*Example 2*

About one pound of a reaction mixture made up of a dicarboxylic acid mixture containing 97 mol per cent succinic acid and 3 mol per cent maleic acid together with a 50 mol per cent excess of ethylene glycol was esterified as described in Example 1, except that the vacuum treatment was continued for 8 hours. The product was a viscous liquid which cooled to a white, tough, flexible microcrystalline material possessing the property of cold drawing.

*Example 3*

2 mols of decamethylene glycol and 1 mol of dihydromuconic acid were esterified as described in Example 1, except that the vacuum treatment was continued for 8 hours. The resulting viscous, colorless liquid crystallized upon cooling to a white, tough mass. Fibers of this material could be cold drawn to form oriented fibers.

*Example 4*

25 mol per cent excess of a glycol mixture containing 50 mol per cent isopropylene glycol and 50 mol per cent ethylene glycol was esterified as described in Example 1 with a dicarboxylic acid mixture containing 30 mol per cent phthalic acid, 67 per cent sebacic acid and 3 mol per cent maleic acid. A viscous, amorphous gum was produced which when cured as described in Example 1, became a synthetic rubber of good tensile strength.

*Example 5*

20.2 grams (0.1 mol) distilled sebacic acid and 7.44 grams (0.12 mol) ethylene glycol, with 0.025 gram $ZnCl_2$ as a catalyst, were placed in a reaction tube in a 250° C. furnace and a slow stream of dried hydrogen was passed through it. A packed reflux column ten inches long, heated to about 110° C. was attached above the tube. Water soon collected in the side arm of the reflux column. After 3 hours, tests indicated that no more water was being evolved. The column was then removed, a very short receiver was attached in its place, and the pressure in the system was reduced to about 6 millimeters. Glycol distilled over rapidly and after 15 minutes an increase in the viscosity of the product was apparent. At the end of the 3 hours, the very viscous polymer was removed. It crystallized to a tough, white solid which did not break even when large sections were bent double. It could be cold drawn even in thick pieces. The intrinsic viscosity was 0.933.

*Example 6*

A sample made up of 303 grams (1.5 mols) commercial sebacic acid and 130 grams (2.1 mols, 40 per cent excess) ethylene glycol was treated in the same manner as described in Example 5 except that 5 hours were allowed for removal of water and the heating under vacuum was continued for 5 hours. The product was a very tough, straw-colored solid, with an intrinsic viscosity of 1.17, capable of being cold drawn to very strong fibers.

*Example 7*

1.5 grams hexadecanedicarboxylic acid and 1.5 grams (300 per cent excess) trimethylene glycol, with 0.002 gram $ZnCl_2$ as a catalyst, were reacted in the manner described in Example 5. After 3 hours of vacuum treatment the polymer was so viscous that it did not flow appreciably even above its melting point. On being removed, it solidified to a tough flexible solid, threads of which could be cold drawn easily to strong fibers.

*Example 8*

6.73 grams distilled sebacic acid and 8.2 grams (40 per cent excess) decamethylene glycol with 0.006 gram $ZnCl_2$ as a catalyst, were reacted as described in Example 5. After 3 hours of vacuum treatment, the viscosity was so great that the gas channeled the polymer rather than stirring it. On being cooled the product crystallized to a white solid, threads of which could be cold drawn.

Although the invention has been described in terms of its specific embodiments, certain modifications and equivalents will be apparent to those skilled in the art and are intended to be included within the scope of the present invention, which is to be limited only by the reasonable scope of the appended claims.

What is claimed is:

1. The method of forming polyesters of high molecular weight which comprises esterifying a reaction mixture consisting of dihydroxy alkanes and dicarboxy hydrocarbons having a lower vapor pressure than the dihydroxy alkanes, said dihydroxy alkanes being present in an excess of between about 5 mol per cent and about 50 mol per cent over the molar amount of dicarboxy hydrocarbons present, said dicarboxy hydrocarbons containing less olefinic unsaturation, as the sole non-benzenoid unsaturation, than will produce in the final polyester an average of 5 olefinic bonds per 400 atoms in the linear chains, calculated by assuming no cross-linking between molecules at unsaturated bonds, said esterification being carried out by heating said reaction mixture at a temperature between about 180° C. and about 250° C. in a closed vessel provided with a reflux condenser maintained at a temperature in the vicinity of 110° C. so as to permit escape of water vapor while returning vaporized dihydroxy alkane, said vessel and reflux condenser being so proportioned that an excess of dihydroxy alkane remains after substantially all of the carboxyl groups of the dicarboxy hydrocarbon have been esterified, continuously bubbling a dry, oxygen-free, inert gas through the reaction mixture during said esterification, continuing said esterification until substantially all of the carboxyl groups of the dicarboxy hydrocarbon have been esterified, subjecting the resulting product to a high vacuum while maintaining the reaction temperature of between about 180° C. and about 250° C. and continuing the bubbling of inert gas, so as to remove excess dihydroxy alkane and cause further molecular growth of the polyester by ester interchange, and continuing said reaction until the polyester has achieved a degree of condensation such that the number of ester groups in the polyester constitutes at least 98 per cent of the total number of ester, hydroxyl and carboxyl groups in said polyester.

2. The method of forming polyesters of high molecular weight which comprises esterifying a reaction mixture consisting of dihydroxy alkanes, dicarboxy alkanes of lower vapor pressure than the dihydroxy alkanes, and dicarboxy olefins, said dihydroxy alkanes being present in an excess of between about 5 mol per cent and about 50 mol per cent over the molar amount of dicarboxy compounds present, said dicarboxy alkanes and dicarboxy olefins being so proportioned that the final polyester which is produced contains an average of less than 5 olefinic bonds per 400 atoms in the linear chains, calculated by assuming no cross-linking between molecules at unsaturated bonds, said esterification being carried out by heating said reaction mixture at a temperature in the vicinity of 200° C. in a closed vessel provided with a reflux condenser maintained at a temperature in the vicinity of 110° C. so as to permit escape of water vapor while returning vaporized dihydroxy alkane, said vessel and reflux condenser being so proportioned that an excess of dihydroxy alkane remains in the reaction product after substantially all of the carboxyl groups of the dicarboxy compounds have been esterified, continuously bubbling a dry, oxygen-free, inert gas through the reaction mixture during said esterification, continuing said esterification until substantially all of the carboxyl groups of the dicarboxy compounds have been esterified, subjecting the resulting product to a high vacuum while maintaining the reaction temperature in the vicinity of 200° C. and continuing the bubbling of inert gas, so as to remove excess glycol and cause further molecular growth of the polyester by ester interchange, and continuing said reaction until the polyester has achieved a degree of condensation such that the number of ester groups in the polyester constitutes at least 98 per cent of the total number of ester, hydroxyl and carboxyl groups in said polyester.

3. The method described in claim 2 wherein the dihydroxy alkanes consist of isopropylene glycol and a dihydroxy straight chain alkane in which the hydroxyl groups are substituted on the two end carbon atoms of the alkane, wherein the dicarboxy olefins consist of maleic acid and wherein the dicarboxy alkanes consist of a dicarboxy straight chain alkane in which the carboxyl groups are substituted on the two end carbon atoms of the alkane.

4. The method described in claim 2 wherein the dihydroxy alkanes consist of a mixture containing at least 80 mol per cent of isopropylene glycol, the remainder being ethylene glycol, wherein the dicarboxy olefins consist of maleic acid and wherein the dicarboxy alkanes consist of sebacic acid, the maleic acid constituting between about 1 mol per cent and about 5 mol per cent of the total maleic and sebacic acids.

5. The method described in claim 2 wherein the dihydroxy alkanes consist of a mixture containing at least 50 mol per cent of isopropylene glycol, the remainder being ethylene glycol, wherein the dicarboxy olefins consist of maleic acid and wherein the dicarboxy alkanes consist of succinic acid, the maleic acid being present in an amount between about 1 mol per cent and about 5 mol per cent of the total maleic and succinic acids.

6. The method described in claim 2 wherein a molar excess of dihydroxy alkanes of at least 20 per cent is present in the initial reaction mixture.

7. The method of forming polyesters of high molecular weight which comprises esterifying a reaction mixture consisting of dihydroxy straight chain alkanes and dicarboxy straight chain alkanes having a lower vapor pressure than the dihydroxy alkanes, said dihydroxy alkanes being present in an excess of between about 5 mol per cent and about 50 mol per cent over the molar amount of dicarboxy alkanes present, said esterification being carried out by heating said reaction mixture at a temperature between about 180° C. and about 250° C. in a closed vessel provided with a reflux condenser maintained at a temperature in the vicinity of 110° C. so as to permit escape of water vapor while returning vaporized dihydroxy alkane, said vessel and reflux condenser being so proportioned that an excess of dihydroxy alkane remains after substantially all of the carboxyl groups of the dicarboxy alkane have been esterified, continuously bubbling a dry, oxygen-free, inert gas through the reaction mixture during said esterification, continuing said esterification until substantially all of the carboxyl groups of the dicarboxy alkane have been esterified, subjecting the resulting product to a high vacuum while maintaining the reaction temperature at between about 180° C. and about 250° C. and continuing the bubbling of inert gas, so as to remove excess dihydroxy alkane and cause further molecular growth of the polyester by ester interchange, and continuing said reaction until the polyester has achieved an intrinsic viscosity in excess of .4.

JOHN B. HOWARD.